(12) United States Patent
Mo et al.

(10) Patent No.: US 11,985,712 B2
(45) Date of Patent: May 14, 2024

(54) INFORMATION TRANSMISSION METHOD, INFORMATION DETECTION METHOD, TERMINAL DEVICE, AND NETWORK DEVICE

(71) Applicant: VIVO MOBILE COMMUNICATION CO., LTD., Chang'an Dongguan (CN)

(72) Inventors: Yitao Mo, Chang'an Dongguan (CN); Yumin Wu, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 402 days.

(21) Appl. No.: 17/390,452

(22) Filed: Jul. 30, 2021

(65) Prior Publication Data
US 2021/0360711 A1 Nov. 18, 2021

Related U.S. Application Data

(63) Continuation of application No. PCT/CN2020/073780, filed on Jan. 22, 2020.

(30) Foreign Application Priority Data

Jan. 30, 2019 (CN) .......................... 201910093607.1

(51) Int. Cl.
*H04W 74/0833* (2024.01)
*H04W 72/0446* (2023.01)
(Continued)

(52) U.S. Cl.
CPC ... *H04W 74/0858* (2013.01); *H04W 72/0446* (2013.01); *H04W 72/0453* (2013.01);
(Continued)

(58) Field of Classification Search
CPC .......... H04W 74/006; H04W 72/0446; H04W 72/0453; H04W 74/0858; H04W 72/23; H04W 74/0833
See application file for complete search history.

(56) References Cited

U.S. PATENT DOCUMENTS

2017/0215207 A1   7/2017   Yi et al.
2017/0245250 A1   8/2017   Zhang et al.
(Continued)

FOREIGN PATENT DOCUMENTS

CN   108282901 A   7/2018
CN   108632987 A   10/2018
(Continued)

OTHER PUBLICATIONS

Extended European Search Report for related Application No. 20748554.1; dated Feb. 25, 2022.
(Continued)

*Primary Examiner* — Kwang B Yao
*Assistant Examiner* — Bradley D Lytle, Jr.
(74) *Attorney, Agent, or Firm* — von Briesen & Roper, s.c.

(57) ABSTRACT

An information transmission method, an information detection method, a terminal device, and a network device are provided. The information transmission method includes: transmitting DCI to a terminal device based on a current random access type, where the DCI is used to schedule a random access response message corresponding to the current random access type.

14 Claims, 3 Drawing Sheets

Perform detection for target DCI based on a current random access type — 201

(51) Int. Cl.
  *H04W 72/0453* (2023.01)
  *H04W 72/20* (2023.01)
  *H04W 72/23* (2023.01)
  *H04W 74/00* (2009.01)
  *H04W 74/08* (2009.01)

(52) U.S. Cl.
  CPC ........... *H04W 72/20* (2023.01); *H04W 72/23* (2023.01); *H04W 74/006* (2013.01); *H04W 74/08* (2013.01); *H04W 74/0833* (2013.01)

(56) References Cited

U.S. PATENT DOCUMENTS

| | | |
|---|---|---|
| 2018/0270869 A1 | 9/2018 | Tsai |
| 2018/0359784 A1* | 12/2018 | Agiwal ................. H04L 5/0007 |
| 2019/0335515 A1 | 10/2019 | Chen et al. |
| 2020/0037367 A1 | 1/2020 | Kim et al. |
| 2022/0095379 A1 | 3/2022 | Xiong et al. |

FOREIGN PATENT DOCUMENTS

| | | | |
|---|---|---|---|
| JP | 2022517012 A | 3/2022 | |
| KR | 20170080678 A | 7/2017 | |
| WO | 2016182391 A1 | 11/2016 | |
| WO | 2017052199 A1 | 3/2017 | |
| WO | WO-2017052199 A1 * | 3/2017 | ............... H04L 5/00 |
| WO | 2018174595 A1 | 9/2018 | |
| WO | 2020146726 A1 | 7/2020 | |

OTHER PUBLICATIONS

Indian Examination Report for related Application No. 202127037748; dated Mar. 4, 2022.
International Search Report and Written Opinion related to PCT/CN2020/073780; dated Apr. 8, 2020.
Second Japanese Office Action related to Application No. 2021-544409; dated Dec. 7, 2022.
R1-1803524—Source: Qualcomm Incorporated "Summary of Remaining Details on RACH Procedure", Agenda Item: 7.1.1.4.2, Document for: Discussion and Decision, 3GPP TSG-RAN WG1 92, Athens, Greece, Feb. 26-Mar. 2, 2018.
International Search Report and Written Opinion related to PCT/CN2019/073780; dated Apr. 8, 2020.
Japanese Notice of Reasons for Refusal for related Application No. 2021-544409; dated Jul. 11, 2022.

* cited by examiner

INFORMATION TRANSMISSION METHOD, INFORMATION DETECTION METHOD, TERMINAL DEVICE, AND NETWORK DEVICE

CROSS-REFERENCE TO RELATED APPLICATIONS

This application is continuation application of PCT International Application No. PCT/CN2020/073780 filed on Jan. 22, 2020, which claims priority to Chinese Patent Application No. 201910093607.1, filed in China on Jan. 30, 2019, the disclosures of which are incorporated in their entireties by reference herein.

TECHNICAL FIELD

This disclosure relates to the field of communications technologies, and in particular, to an information transmission method, an information detection method, a terminal device, and a network device.

BACKGROUND

In future network deployment such as 5G network deployment, an R15 terminal device (User Equipment, UE) and an R16 UE possibly coexist in a cell. Hence the following application scenario exists: In a case that the R15 UE initiates a contention-based 4-step random access procedure and the R16 UE initiates a contention-based 2-step random access procedure, a random access response message transmitted by a network device to UE may be a Msg2 message (corresponding to the 4-step random access procedure), or a MsgB message (corresponding to the 2-step random access procedure). In this application scenario, it needs to be ensured that the UEs can receive random access response messages corresponding to current random access types with differentiation, to avoid data parsing errors.

SUMMARY

Embodiments of this disclosure provide an information transmission method, an information detection method, a terminal device, and a network device, to resolve a problem that terminal devices cannot receive random access response messages corresponding to their current random access types with differentiation in a case that there are at least two types of random access procedures.

To resolve the foregoing technical problem, the embodiments of this disclosure are implemented as follows.

According to a first aspect, an embodiment of this disclosure provides an information transmission method, applied to a network device, including:
transmitting DCI to a terminal device based on a current random access type, where
the DCI is used to schedule a random access response message corresponding to the current random access type.

According to a second aspect, an embodiment of this disclosure provides an information detection method, applied to a terminal device, including:
performing detection for target DCI based on a current random access type, where
the target DCI is used to schedule a random access response message corresponding to the current random access type.

According to a third aspect, an embodiment of this disclosure provides a network device, including:
a first transmission module, configured to transmit DCI to a terminal device based on a current random access type, where
the DCI is used to schedule a random access response message corresponding to the current random access type.

According to a fourth aspect, an embodiment of this disclosure provides a terminal device, including:
a detection module, configured to perform detection for target DCI based on a current random access type, where
the target DCI is used to schedule a random access response message corresponding to the current random access type.

According to a fifth aspect, an embodiment of this disclosure provides a network device, including a memory, a processor, and a computer program stored in the memory and capable of running on the processor, where when the computer program is executed by the processor, the steps of the foregoing information transmission method can be implemented.

According to a sixth aspect, an embodiment of this disclosure provides a terminal device, including a memory, a processor, and a computer program stored in the memory and capable of running on the processor, where when the computer program is executed by the processor, the steps of the foregoing information detection method can be implemented.

According to a seventh aspect, an embodiment of this disclosure provides a computer-readable storage medium that stores a computer program, where when the computer program is executed by a processor, the steps of the information transmission method or the steps of the information detection method can be implemented.

In the embodiments of this disclosure, a network device transmits DCI to a terminal device based on a current random access type, where the DCI is used to schedule a random access response message corresponding to the current random access type, so that the network device and the terminal device can have consistent understanding in a random access procedure. This ensures that the terminal device can receive corresponding random access response messages with differentiation in a case that at least two types of random access procedures are supported, thereby ensuring subsequent correct data parsing and successful completion of the random access procedures.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

It should be first pointed out that a wireless communications system in the embodiments of this disclosure includes a terminal device and a network device. The terminal device may also be referred to as a terminal or user equipment (UE). The terminal may be a terminal-side device such as a mobile phone, a tablet personal computer, a laptop computer, a personal digital assistant (PDA), a mobile Internet device (MID), a wearable device, or an in-vehicle device. A specific type of the terminal is not limited in the embodiments of this disclosure. The network device may be a base station or a core network. The base station may be a base station of 5G or a later release (for example, gNB or 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or some other appropriate terms in the art. The base station is not limited to a specific technical term, providing that a same technical effect is achieved.

The following details this disclosure with reference to the embodiments and the accompanying drawings.

Figure 1:
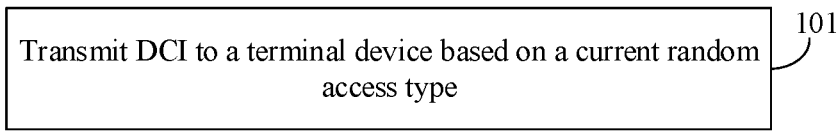
FIG. 1 is a flowchart of an information transmission method according to an embodiment of this disclosure.

FIG. 1 is a flowchart of an information transmission method according to an embodiment of this disclosure. The method is applied to a network device. As shown in FIG. 1, the method includes the following step:

Step 101: Transmit DCI to a terminal device based on a current random access type.

The downlink control information (DCI) is used to schedule a random access response message corresponding to the current random access type. For example, if the current random access type is 4-step RACH, the DCI is used to schedule a Msg2 message; or if the current random access type is 2-step RACH, the DCI is used to schedule a MsgB message.

In specific implementation, the DCI may be carried on a physical downlink control channel (PDCCH), and transmitted in a target search space within a specified window of time. The network device may detect the current random access type to learn a type of a random access procedure initiated by the terminal device, for example, 4-step RACH or 2-step RACH.

According to the information transmission method in this embodiment of this disclosure, a network device transmits DCI to a terminal device based on a current random access type, where the DCI is used to schedule a random access response message corresponding to the current random access type, so that the network device and the terminal device can have consistent understanding in a random access procedure. This ensures that the terminal device can receive corresponding random access response messages with differentiation in a case that at least two random access types are supported, thereby ensuring subsequent correct data parsing and successful completion of the random access procedures.

In this embodiment of this disclosure, in a case that resources required for at least two types of random access are configured in one cell, for example, in a case that resources required for both contention-based 4-step random access procedures and contention-based 2-step random access procedures are configured, the network device can use different manners to enable the terminal device to receive Msg2 messages or MsgB messages with differentiation, so as to avoid inconsistent understanding between the network device and the terminal device.

Specifically, to ensure that the terminal device receives random access response messages with differentiation, indication information may be added to the DCI in this embodiment of this disclosure. To be specific, the DCI includes indication information, and the indication information is used to indicate a random access type corresponding to the random access response message scheduled by the DCI.

In this way, in reception of a random access response message, the terminal device may first blindly detect DCI, then parse indication information in the blindly detected DCI, and finally judge whether a random access response message scheduled by the blindly detected DCI corresponds to the current random access type. If yes, the terminal device determines that the blindly detected DCI is the target DCI required; or if no, determines that the blindly detected DCI is not the target DCI required, and skips receiving data scheduled by the blindly detected DCI, thereby receiving corresponding random access response messages with differentiation.

For example, the indication information added to the DCI is optionally a 1-bit indicator variable. Any one of 16 bits reserved in DCI format 1_0 for which CRC scrambling is performed using an RA-RNTI is specified as an indicator variable for RACH type (2-step RACH or 4-step RACH). If a value of the indicator variable is 0, it indicates that the corresponding DCI schedules a Msg2 message, or if a value of the indicator variable is 1, it indicates that the corresponding DCI schedules a MsgB message. As such, if the terminal device most recently initiates 2-step RACH (4-step RACH), and the RACH type indicator variable in the detected DCI is 1 (0), a transport block (TB) received on a corresponding physical downlink shared channel (PDSCH) within a threshold window may be delivered to a higher layer. Otherwise, the terminal device processes, in a preset manner, a data block scheduled by the blindly detected DCI.

The preset manner includes any one of the following:
skipping receiving any data block scheduled by the blindly detected DCI; and
discarding any data block received that is scheduled by the blindly detected DCI.

Similarly, apart from the foregoing definition, it may alternatively be defined that if the value of the indicator variable is 0, it indicates that the corresponding DCI schedules a MsgB message, or if the value of the indicator variable is 1, it indicates that the corresponding DCI schedules a Msg2 message.

In this embodiment of this disclosure, to ensure that the terminal device receives random access response messages with differentiation, the network device may configure different search spaces for DCI (PDCCH) that schedules different types of random access response messages. For example, for 4-step RACH and 2-step RACH, any one of the following combinations may be configured:

A and B, A and D, and B and C, where

A indicates that a search space corresponding to DCI that schedules Msg2 is a first search space, and the first search space is configured in a first CORESET;

B indicates that a search space corresponding to DCI that schedules MsgB is a second search space, and the second search space is configured in the first CORESET;

C indicates that a search space corresponding to DCI that schedules Msg2 is a first search space, and the first search space is configured in a second CORESET; and D indicates that a search space corresponding to DCI that schedules MsgB is a second search space, and the second search space is configured in the second CORESET.

Optionally, before step 101, the method may further include:

transmitting PDCCH configuration information to the terminal device, where the PDCCH configuration information includes at least two types of search space configuration information, and each type of search space configuration information is configured for DCI that schedules response messages corresponding to one random access type. This search space configuration information may be understood as common search space configuration information.

For example, in a case that a serving cell is configured with resources required for both 4-step RACH and 2-step RACH, the PDCCH configuration information may include two types of search space configuration information, of which one is configured for DCI that schedules MsgB, and the other is configured for DCI that schedules Msg2.

It can be understood that the PDCCH configuration information may be broadcast through a system message. The system message may include at least one of the following: search space parameter, control-resource set information, blind detection periodicity, and the like. Alternatively, the PDCCH configuration information may be transmitted through RRC signaling.

In this way, with the PDCCH configuration information transmitted to the terminal device, the terminal device can learn a relevant configuration, thereby effectively performing PDCCH detection.

Further, step 101 may include:

transmitting the DCI to the terminal device in a target search space, where the target search space corresponds to the current random access type.

In this way, the DCI is transmitted in the target search space, enabling the terminal device to detect the target DCI in the target search space, thereby ensuring reception of random access response messages with differentiation.

In this embodiment of this disclosure, to ensure that the terminal device receives random access response messages with differentiation, a variable associated with random access type may be added to a formula for calculating a random access radio network temporary identity (RA-RNTI) for scrambling DCI, so that the terminal device uses the same RA-RNTI to perform cyclic redundancy check (CRC) check. If the CRC check succeeds, a TB received on a corresponding PDSCH within a threshold window is delivered to a higher layer.

Optionally, the DCI transmitted by the network device in step 101 may be scrambled by an RA-RNTI, where the RA-RNTI is associated with the current random access type.

Further, the RA-RNTI may be calculated using the following formula:

RA-RNTI=
1+n1×s_id+n2×14×t_id+n3×14×A×f_id+n4×14×A×B× ul_carrier_id+n5×E_id, where s_id is an orthogonal frequency division multiplexing (OFDM) symbol index of the first symbol of a physical random access channel (PRACH) time domain resource, and t_id is a slot index of the first slot of the PRACH time domain resource;

f_id is a frequency-domain index of a PRACH occasion RO on the PRACH time domain resource;

A is any one of the following numerical values: a natural number configured by the network device, a preset value, a numerical value indicated by the terminal device, and the number of slots in a preset time window;

B is any one of the following numerical values: a natural number configured by the network device, a preset value, a numerical value indicated by the terminal device, and the number of ROs for frequency-division multiplexing (FDM) on the PRACH time domain resource;

ul_carrier_id is any one of the following numerical values: a natural number configured by the network device, a preset value, and a numerical value indicated by the terminal device;

n1, n2, n3, n4, and n5 are preset coefficients, where values of the coefficients are optionally integers; and E_id is a variable associated with random access type, where the variable is optionally an index of the random access type, which has an integer value.

For example, if types of initiated RACH include 2-step RACH and 4-step RACH, the E_id is optionally a binary variable. For example, E_id is equal to 0 or 1, where 0 means 4-step RACH, and 1 means 2-step RACH; or 0 means 2-step RACH, and 1 means 4-step RACH.

In an embodiment, n1=n2=n3=n4=1, A=80, B=8, n5=14× 80×8×2, and E_id=ra_type_id, in which case:

RA-RNTI=
1+s_id+14×t_id+14×80×f_id+14×80×8×ul_carrier_id+ 14×80×8×2×ra_typ e_id, where ra_type_id represents the random access type, and 0 represents 4-step RACH, and 1 represents 2-step RACH.

In another embodiment, n1=n2=n3=n4=2, A=80, B=8, n5=1, and E_id=ra_type_id, in which case:

RA-RNTI=
1+ra_type_id+2×s_id+2×14×t_id+2×14×80×f_id+2×14× 80×8×ul_carrier_id, where ra_type_id represents the random access type, and 0 represents 4-step RACH, and 1 represents 2-step RACH.

In another embodiment, n1=n2=n3=1, A=80, B=8, n4=2, n5=14×80×8, and E_id=ra_type_id, in which case:

RA-RNTI=
1+s_id+14×t_id+14×80×f_id+14×80×8×ra_type_id+14× 80×8×2×ul_carrier_id, where ra_type_id represents the random access type, and 0 represents 4-step RACH, and 1 represents 2-step RACH.

Figure 2:
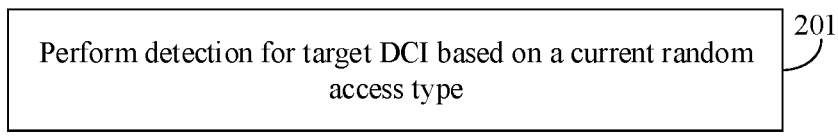
FIG. 2 is a flowchart of an information detection method according to an embodiment of this disclosure.

FIG. 2 is a flowchart of an information detection method according to an embodiment of this disclosure. The method is applied to a terminal device. As shown in FIG. 2, the method includes the following step:

Step 201: Perform detection for target DCI based on a current random access type.

The target DCI is used to schedule a random access response message corresponding to the current random access type. The target DCI may be understood as DCI required by the terminal device. For example, if the current random access type is 4-step RACH, the target DCI is used to schedule a Msg2 message; or if the current random access type is 2-step RACH, the target DCI is used to schedule a MsgB message. The performing detection for target DCI may be implemented by performing corresponding PDCCH detection.

According to the information detection method in this embodiment of this disclosure, detection for target DCI is performed based on a current random access type, so that a network device and a terminal device can have consistent understanding in a random access procedure. This ensures that terminal device can receive corresponding random access response messages with differentiation in a case that at least two random access types are supported, thereby ensuring subsequent correct data parsing and successful completion of the random access procedures.

In this embodiment of this disclosure, optionally, step 201 may include:

performing blind detection for DCI, where the blind detection for DCI may be performed through blind detection for a PDCCH;

judging, based on indication information included in blindly detected DCI, whether a random access response message scheduled by the blindly detected DCI corresponds to the current random access type; and in a case that the random access response message scheduled by the blindly detected DCI corresponds to the current random access type, determining that the blindly detected DCI is the target DCI; where the indication information is used to indicate a random access type corresponding to the random access response message scheduled by the blindly detected DCI.

Optionally, the method may further include:

in a case that the random access response message scheduled by the blindly detected DCI does not correspond to the current random access type, determining that the blindly detected DCI is not the target DCI; and processing, in a preset manner, a data block scheduled by the blindly detected DCI, where the preset manner includes any one of the following:

skipping receiving any data block scheduled by the blindly detected DCI; and discarding any data block received that is scheduled by the blindly detected DCI.

Optionally, before step 201, the method may further include:

receiving PDCCH configuration information from a network device, where the PDCCH configuration information includes at least two types of search space configuration information, and each type of search space configuration information is configured for DCI that schedules response messages corresponding to one random access type.

Optionally, step 201 may include:

performing detection for the target DCI in a target search space based on the current random access type and the PDCCH configuration information, where the target search space corresponds to the current random access type.

Optionally, step 201 may include:

performing, based on the current random access type, detection for the target DCI scrambled by an RA-RNTI, where the RA-RNTI is associated with the current random access type. The performing detection for the target DCI scrambled by an RA-RNTI may be understood as using the RA-RNTI to descramble the DCI, so as to detect the target DCI scrambled by the RA-RNTI.

Optionally, the RA-RNTI is calculated using the following formula:

RA-RNTI=
1+n1×s_id+n2×14×t_id+n3×14×A×f_id+n4×14×A×B×ul_carrier_id+n5×E_id, where s_id is an OFDM symbol index of the first symbol of a PRACH time domain resource, t_id is a slot index of the first slot of the PRACH time domain resource, and f_id is a frequency-domain index of an RO on the PRACH time domain resource;

A is any one of the following numerical values: a natural number configured by the network device, a preset value, a numerical value indicated by the terminal device, and the number of slots in a preset time window;

B is any one of the following numerical values: a natural number configured by the network device, a preset value, a numerical value indicated by the terminal device, and the number of ROs for FDM on the PRACH time domain resource;

ul_carrier_id is any one of the following numerical values: a natural number configured by the network device, a preset value, and a numerical value indicated by the terminal device;

n1, n2, n3, n4, and n5 are preset coefficients; and

E_id is a variable associated with random access type.

The foregoing embodiments describe the information transmission method and the information detection method in this disclosure, and the following describes a network device and a terminal device in this disclosure with reference to the embodiments and the drawings.

Figure 3:
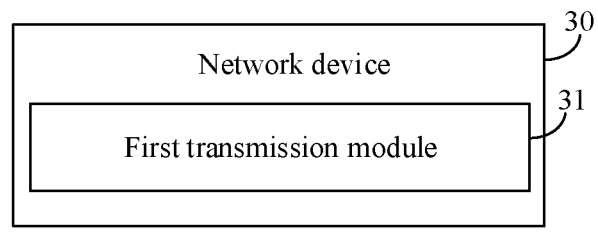
FIG. 3 is a first schematic structural diagram of a network device according to an embodiment of this disclosure.

FIG. 3 is a schematic structural diagram of a network device according to an embodiment of this disclosure. As shown in FIG. 3, the network device 30 includes:

a first transmission module 31, configured to transmit DCI to a terminal device based on a current random access type, where the DCI is used to schedule a random access response message corresponding to the current random access type.

The network device in this embodiment of this disclosure transmits DCI to a terminal device based on a current random access type, where the DCI is used to schedule a random access response message corresponding to the current random access type, so that the network device and the terminal device can have consistent understanding in a random access procedure. This ensures that the terminal device can receive corresponding random access response messages with differentiation in a case that at least two random access types are supported, thereby ensuring subsequent correct data parsing and successful completion of the random access procedures.

In this embodiment of this disclosure, optionally, the DCI includes indication information, and the indication information is used to indicate a random access type corresponding to the random access response message scheduled by the DCI.

Optionally, the network device further includes:

a second transmission module, configured to transmit PDCCH configuration information to the terminal device, where the PDCCH configuration information includes at least two types of search space configuration information, and each type of search space configuration information is configured for DCI that schedules response messages corresponding to one random access type.

Optionally, the first transmission module is specifically configured to:

transmit the DCI to the terminal device in a target search space, where the target search space corresponds to the current random access type.

Optionally, the DCI is scrambled by an RA-RNTI, and the RA-RNTI is associated with the current random access type.

Optionally, the RA-RNTI is calculated using the following formula:

RA-RNTI= $1+n1 \times s\_id+n2 \times 14 \times t\_id+n3 \times 14 \times A \times f\_id+n4 \times 14 \times A \times B \times ul\_carrier\_id+n5 \times E\_id$, where s_id is an OFDM symbol index of the first symbol of a PRACH time domain resource, t_id is a slot index of the first slot of the PRACH time domain resource, and f_id is a frequency-domain index of an RO on the PRACH time domain resource;

A is any one of the following numerical values: a natural number configured by the network device, a preset value, a numerical value indicated by the terminal device, and the number of slots in a preset time window;

B is any one of the following numerical values: a natural number configured by the network device, a preset value, a numerical value indicated by the terminal device, and the number of ROs for FDM on the PRACH time domain resource;

ul_carrier_id is any one of the following numerical values: a natural number configured by the network device, a preset value, and a numerical value indicated by the terminal device;

n1, n2, n3, n4, and n5 are preset coefficients; and

E_id is a variable associated with random access type.

Figure 4:
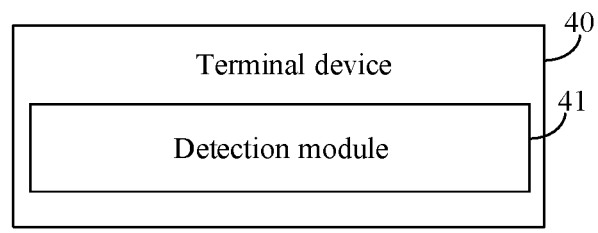
FIG. 4 is a first schematic structural diagram of a terminal device according to an embodiment of this disclosure.

FIG. 4 is a schematic structural diagram of a terminal device according to an embodiment of this disclosure. As shown in FIG. 4, the terminal device 40 includes:

a detection module 41, configured to perform detection for target DCI based on a current random access type, where the target DCI is used to schedule a random access response message corresponding to the current random access type.

The terminal device in this embodiment of this disclosure performs detection for target DCI based on a current random access type, so that a network device and the terminal device can have consistent understanding in a random access procedure. This ensures that the terminal device can receive corresponding random access response messages with differentiation in a case that at least two random access types are supported, thereby ensuring subsequent correct data parsing and successful completion of the random access procedures.

In this embodiment of this disclosure, optionally, the detection module 41 includes:

a detection unit, configured to perform blind detection for DCI;

a judging unit, configured to judge, based on indication information included in blindly detected DCI, whether a random access response message scheduled by the blindly detected DCI corresponds to the current random access type; and a determining unit, configured to: in a case that the random access response message scheduled by the blindly detected DCI corresponds to the current random access type, determine that the blindly detected DCI is the target DCI; where the indication information is used to indicate a random access type corresponding to the random access response message scheduled by the blindly detected DCI.

Optionally, the determining unit is further configured to:

in a case that the random access response message scheduled by the blindly detected DCI does not correspond to the current random access type, determine that the blindly detected DCI is not the target DCI; and the terminal device further includes:

a processing module, configured to process, in a preset manner, a data block scheduled by the blindly detected DCI, where the preset manner includes any one of the following:

skipping receiving any data block scheduled by the blindly detected DCI; and discarding any data block received that is scheduled by the blindly detected DCI.

Optionally, the terminal device further includes:

a receiving module, configured to receive PDCCH configuration information from a network device, where the PDCCH configuration information includes at least two types of search space configuration information, and each type of search space configuration information is configured for DCI that schedules response messages corresponding to one random access type.

Optionally, the detection module 41 is specifically configured to:

perform detection for the target DCI in a target search space based on the current random access type and the PDCCH configuration information, where the target search space corresponds to the current random access type.

Optionally, the detection module 41 is specifically configured to:

perform, based on the current random access type, detection for the target DCI scrambled by an RA-RNTI, where the RA-RNTI is associated with the current random access type.

Optionally, the RA-RNTI is calculated using the following formula:

RA-RNTI= $1+n1 \times s\_id+n2 \times 14 \times t\_id+n3 \times 14 \times A \times f\_id+n4 \times 14 \times A \times B \times ul\_carrier\_id+n5 \times E\_id$, where s_id is an OFDM symbol index of the first symbol of a PRACH time domain resource, t_id is a slot index of the first slot of the PRACH time domain resource, and f_id is a frequency-domain index of an RO on the PRACH time domain resource;

A is any one of the following numerical values: a natural number configured by the network device, a preset value, a numerical value indicated by the terminal device, and the number of slots in a preset time window;

B is any one of the following numerical values: a natural number configured by the network device, a preset value, a numerical value indicated by the terminal device, and the number of ROs for FDM on the PRACH time domain resource;

ul_carrier_id is any one of the following numerical values: a natural number configured by the network device, a preset value, and a numerical value indicated by the terminal device;

n1, n2, n3, n4, and n5 are preset coefficients; and

E_id is a variable associated with random access type.

In addition, an embodiment of this disclosure further provides a network device, including a processor, a memory, and a computer program stored in the memory and capable of running on the processor. When the computer program is executed by the processor, the processes of the foregoing information transmission method embodiment are implemented, with the same technical effects achieved. To avoid repetition, details are not described herein again.

An embodiment of this disclosure further provides a terminal device, including a processor, a memory, and a computer program stored in the memory and capable of running on the processor. When the computer program is executed by the processor, the processes of the foregoing information detection method embodiment are implemented, with the same technical effects achieved. To avoid repetition, details are not described herein again.

Figure 5:
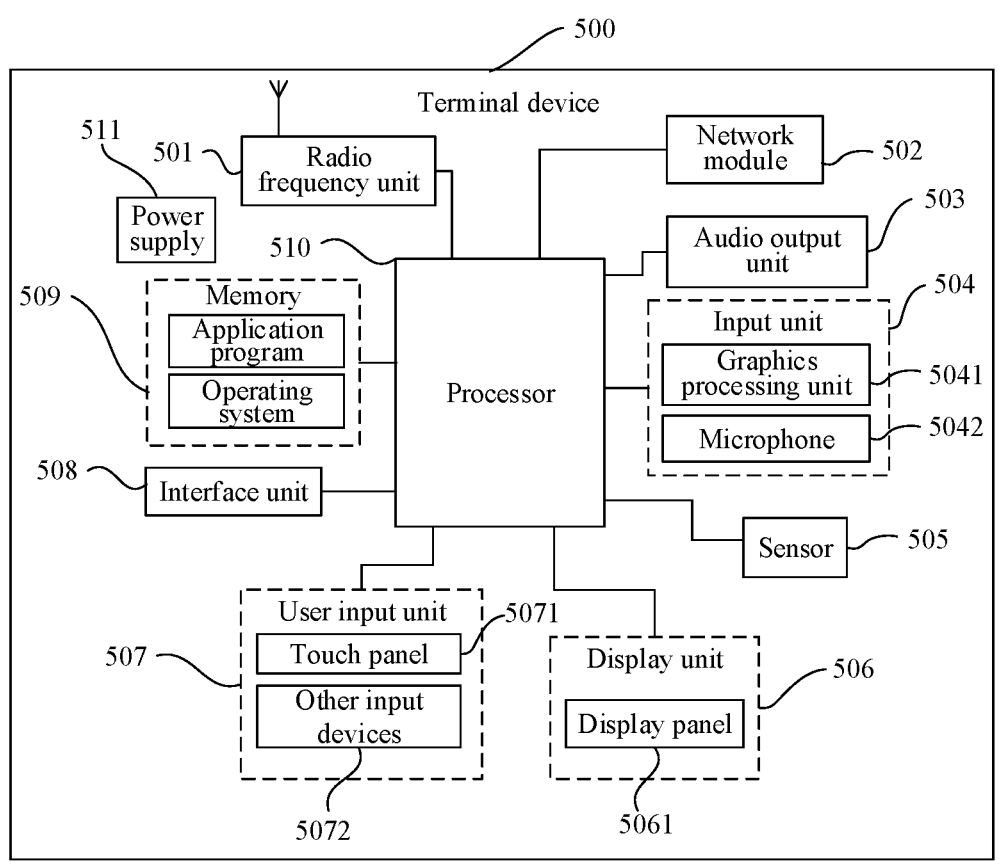
FIG. 5 is a second schematic structural diagram of a terminal device according to an embodiment of this disclosure.

Specifically, FIG. 5 is a schematic diagram of a hardware structure of a terminal device for implementing the embodiments of this disclosure. The terminal device 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art can understand that the terminal device is not limited to the terminal device structure shown in FIG. 5. The terminal device may include more or fewer components than those shown in the figure, or combine some of the components, or arrange the components differently. In this embodiment of this disclosure, the terminal device includes but is not limited to a mobile phone, a tablet personal computer, a notebook computer, a palmtop computer, an in-vehicle terminal device, a wearable device, a pedometer, and the like.

The processor 510 is configured to detect target DCI based on a current random access type, where the target DCI is used to schedule a random access response message corresponding to the current random access type.

According to this embodiment of this disclosure, a network device and the terminal device can have consistent understanding in a random access procedure, ensuring that the terminal device can receive corresponding random access response messages with differentiation in a case that at least two random access types are supported, thereby ensuring subsequent correct data parsing and successful completion of the random access procedures.

It should be understood that in this embodiment of this disclosure, the radio frequency unit 501 may be configured to receive and transmit information, or to receive and transmit a signal in a call process, and specifically, after receiving downlink data from a base station, transmit the downlink data to the processor 510 for processing; and also transmit uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may further communicate with a network and other devices through a wireless communications system.

The terminal device provides a user with wireless broadband Internet access through the network module 502, for example, helping a user to transmit or receive an e-mail, to browse a web page, or to access streaming media.

The audio output unit 503 may convert audio data into an audio signal, and output the audio signal as sound, where the audio data is received by the radio frequency unit 501 or the network module 502, or stored in the memory 509. In addition, the audio output unit 503 may further provide audio output (for example, a call signal received sound or a message received sound) that is related to a specific function performed by the terminal device 500. The audio output unit 503 includes a loudspeaker, a buzzer, a phone receiver, and the like.

The input unit 504 is configured to receive an audio signal or a video signal. The input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. A processed image frame may be displayed on the display unit 506. An image frame processed by the graphics processing unit 5041 may be stored in the memory 509 (or another storage medium), or may be transmitted by the radio frequency unit 501 or the network module 502. The microphone 5042 may receive a sound, and can process the sound into audio data. In a phone call mode, processed audio data may be converted into a format for transmission by the radio frequency unit 501 to a mobile communications base station, and output as such.

The terminal device 500 further includes at least one sensor 505, for example, an optical sensor, a motion sensor, and other sensors. Specifically, the optical sensor includes an ambient light sensor and a proximity sensor. The ambient light sensor may adjust brightness of a display panel 5061 based on intensity of ambient light. When the terminal device 500 moves near an ear, the proximity sensor may disable the display panel 5061 and/or backlight. As a type of motion sensor, an accelerometer sensor can detect magnitudes of accelerations in all directions (usually three axes), can detect the magnitude and direction of gravity when the mobile phone is in a static state, and can be applied to terminal device posture recognition (such as screen switching between portrait and landscape, related games, and magnetometer posture calibration), functions related to vibration recognition (such as pedometer and tapping), and the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061. The display panel 5061 may be configured in a form of a liquid crystal display (LCD), an organic light-emitting diode (OLED), or the like.

The user input unit 507 may be configured to receive input digit or character information, and generate key signal input that is related to user setting and function control of the terminal device. Specifically, the user input unit 507 includes a touch panel 5071 and other input devices 5072. The touch panel 5071 is also referred to as a touchscreen, and may collect a touch operation of the user on or near the touch panel (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch orientation of the user, and detects a signal brought by the touch operation, and transmits the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented in a plurality of types, for example, as a resistive, capacitive, infrared, or surface acoustic wave touch panel. In addition to the touch panel 5071, the user input unit 507 may further include the other input devices 5072. Specifically, the other input devices 5072 may include but are not limited to a physical keyboard, a function key (for example, a volume control key or a power on/off key), a track ball, a mouse, and a joystick. Details are not described herein.

Further, the touch panel 5071 may cover the display panel 5061. When detecting a touch operation on or near the touch panel 5071, the touch panel 5071 transmits the touch operation to the processor 510 to determine a type of a touch event. Then, the processor 510 provides a corresponding visual output on the display panel 5061 based on the type of the touch event. In FIG. 5, the touch panel 5071 and the display panel 5061 serve as two separate components to implement input and output functions of the terminal device. However, in some embodiments, the touch panel 5071 and the display panel 5061 may be integrated to implement the input and output functions of the terminal device. This is not specifically limited herein.

The interface unit 508 is an interface for connecting an external apparatus to the terminal device 500. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 508 may be configured to receive input (for example, data information and electric power) from the external apparatus, and transmit the received input to one or more elements in the terminal device 500; or may be configured to transmit data between the terminal device 500 and the external apparatus.

The memory 509 may be configured to store software programs and various types of data. The memory 509 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 509 may include a high-speed random access memory, and may further include a nonvolatile memory, for example, at least one magnetic disc storage device or a flash memory device, or other volatile solid-state storage devices.

The processor 510 is a control center of the terminal device, uses various interfaces and lines to connect all parts of the entire terminal device, and performs various functions and data processing of the terminal device by running or executing the software program and/or module stored in the memory 509 and invoking data stored in the memory 509, thereby performing overall monitoring on the terminal device. The processor 510 may include one or more processing units. Optionally, the processor 510 may integrate an application processor and a modem processor. The application processor mainly processes an operating system, a user interface, an application program, and the like. The modem processor mainly processes wireless communication. It can be understood that the modem processor may alternatively not be integrated into the processor 510.

The terminal device 500 may further include a power supply 511 (for example, a battery) that supplies power to the components. Optionally, the power supply 511 may be logically connected to the processor 510 by using a power management system, so as to implement functions such as charging management, discharging management, and power consumption management by using the power management system.

In addition, the terminal device 500 may further include some functional modules that are not shown. Details are not described herein.

Figure 6:
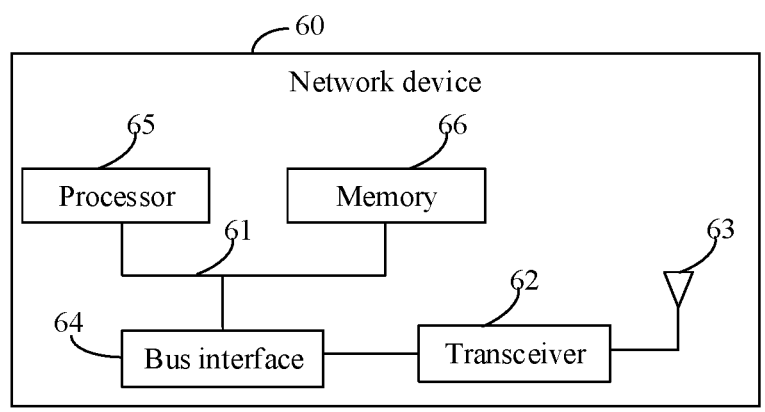
FIG. 6 is a second schematic structural diagram of a network device according to an embodiment of this disclosure.

FIG. 6 is a schematic diagram of a hardware structure of a network device for implementing the embodiments of this disclosure. The network device 60 includes but is not limited to a bus 61, a transceiver 62, an antenna 63, a bus interface 64, a processor 65, and a memory 66.

In this embodiment of this disclosure, the network device 60 further includes a computer program stored in the memory 66 and capable of running on the processor 65. When the computer program is executed by the processor 65, the following step is implemented:

transmitting DCI to a terminal device based on a current random access type, where the DCI is used to schedule a random access response message corresponding to the current random access type.

The transceiver 62 is configured to transmit and receive data under control of the processor 65.

In FIG. 6, in a bus architecture (represented by the bus 61), the bus 61 may include any quantity of interconnected buses and bridges, and the bus 61 connects various circuits that include one or more processors represented by the processor 65 and a memory represented by the memory 66. The bus 61 may further connect various other circuits, such as a peripheral device, a voltage regulator, and a power management circuit. These are common sense in the art, and therefore are not further described in this specification. The bus interface 64 provides an interface between the bus 61 and the transceiver 62. The transceiver 62 may be one element, or may be a plurality of elements, for example, a plurality of receivers and transmitters, and provides a unit for communicating with various other apparatuses on a transmission medium. Data processed by the processor 65 is transmitted on a wireless medium through the antenna 63. Further, the antenna 63 receives data and transmits the data to the processor 65.

The processor 65 is responsible for managing the bus 61 and general processing, and may further provide various functions, including timing, a peripheral interface, voltage regulation, power management, and other control functions. The memory 66 may be used to store data for use by the processor 65 when the processor 65 performs an operation.

Optionally, the processor 65 may be a CPU, an ASIC, an FPGA, or a CPLD.

An embodiment of this disclosure further provides a computer-readable storage medium, where the computer-readable storage medium stores a computer program, and when the computer program is executed by the processor, the processes of the foregoing information transmission method embodiment or the foregoing information detection method embodiment can be implemented, with the same technical effects achieved. To avoid repetition, details are not described herein again. For example, the computer-readable storage medium is a read-only memory (ROM), a random access memory (RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the embodiments, a person skilled in the art may clearly understand that the methods in the foregoing embodiments may be implemented by using software in combination with a necessary common hardware platform, and certainly may alternatively be implemented by using hardware. However, in most cases, the former is a preferred embodiment. Based on such an understanding, the technical solutions of this disclosure essentially, or a part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to these embodiments. These embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. An information transmission method, applied to a network device, comprising:
    transmitting downlink control information (DCI) to a terminal device based on a current random access type, wherein
    the DCI is used to schedule a random access response message corresponding to the current random access type;
    wherein the DCI is scrambled by a random access radio network temporary identify (RA-RNTI), and the RA-RNTI is associated with the current random access type; and
    wherein the RA-RNTI is calculated using the following formula:
    RA-RNTI= 1+n1×s_id+n2×14×t_id+n3×14×A×f_id+n4×14×A×B× ul_carrier_id+n5×E_id1, wherein
    s_id is an orthogonal frequency division multiplexing (OFDM) symbol index of the first symbol of a physical random access channel (PRACH) time domain resource, t_id is a slot index of the first slot of the PRACH time domain resource, and f_id is a frequency-domain index of a PRACH occasion (RO) on the PRACH time domain resource;
    A is any one of the following numerical values: a natural number configured by the network device, a preset value, a numerical value indicated by the terminal device, or the number of slots in a preset time window;
    B is any one of the following numerical values: a natural number configured by the network device, a preset value, a numerical value indicated by the device, or the number of ROs for frequency-division multiplexing (FDM) on the PRACH time domain resource;
    ul_carrier_id is any one of the following numerical values: a natural number configured by the network device, a preset value, or a numerical value indicated by the terminal device;
    n1, n2, n3, n4, and n5 are preset coefficients; and
    E_id is a variable associated with random access type.

2. The method according to claim 1, wherein the DCI comprises indication information, and the indication information is used to indicate a random access type corresponding to the random access response message scheduled by the DCI.

3. The method according to claim 1, wherein before the transmitting downlink control information DCI to a terminal device based on a current random access type, the method further comprises:
    transmitting physical downlink control channel (PDCCH) configuration information to the terminal device, wherein
    the PDCCH configuration information comprises at least two types of search space configuration information, and each type of search space configuration information is configured for DCI that schedules response messages corresponding to one random access type.

4. The method according to claim 3, wherein the transmitting downlink control information DCI to a terminal device based on a current random access type comprises:
    transmitting the DCI to the terminal device in a target search space, wherein
    the target search space corresponds to the current random access type.

5. An information detection method, applied to a terminal device, comprising:
    performing detection for target DCI based on a current random access type, wherein
    the target DCI is used to schedule a random access response message corresponding to the current random access type;
    wherein the performing detection for target DCI based on a current random access type comprises:
    performing, based on the current random access type, detection for the target DCI scrambled by an RA-RNTI, wherein
    the RA-RNTI is associated with the current random access type; and
    wherein the RA-RNTI is calculated using the following formula:
    RA-RNTI= 1+n1×s_id+n2×14×t_id+n3×14×A×f_id+n4×14×A×B× ul_carrier_id+n5×E_id, wherein
    s_id is an OFDM symbol index of the first symbol of a PRACH time domain resource, t_id is a slot index of the first slot of the PRACH time domain resource, and f_id is a frequency-domain index of an RO on the PRACH time domain resource;
    A is any one of the following numerical values: a natural number configured by the network device, a preset value, a numerical value indicated by the terminal device, or the number of slots in a preset time window;

B is any one of the following numerical values: a natural number configured by the network device, a preset value, a numerical value indicated by the terminal device, or the number of ROs for FDM on the PRACH time domain resource;

ul_carrier_id is any one of the following numerical values: a natural number configured by the network device, a preset value, or a numerical value indicated by the terminal device;

n1, n2, n3, n4, and n5 are preset coefficients; and

E_id is a variable associated with random access type.

6. The method according to claim 5, wherein the performing detection for target DCI based on a current random access type comprises:

performing Hind detection for DCI;

judging, based on indication information comprised in blindly detected DCI whether a random access response message scheduled by the blindly detected DCI corresponds to the current random access type; and in a case that the random access response message scheduled by the blindly detected DCI corresponds to the current random access type, determining that the blindly detected DCI is the target DCI; wherein the indication information is used to indicate a random access type corresponding to the random access response message scheduled by the blindly detected DCI.

7. The method according to claim 6, further comprising:

in a case that the random access response message scheduled by the blindly detected DCI does not correspond to the current random access type, determining that the blindly detected DCI is not the target DCI; and processing, in a preset manner, a data block scheduled by the blindly detected DCI, wherein the preset manner comprises any one of the following:

skipping receiving any data block scheduled by the blindly detected DCI; or discarding any data block received that is scheduled by the blindly detected DCI.

8. The method according to claim 5, wherein before the performing detection for target DCI based on a current random access type, the method further comprises:

receiving PDCCH configuration information from a network device, wherein the PDCCH configuration information comprises at least two types of search space configuration information, and each type of search space configuration information is configured for DCI that schedules response messages corresponding to one random access type.

9. The method according to claim 8, wherein the performing detection for target DCI based on a current random access type comprises:

performing detection for the target DCI in a target search space based on the current random access type and the PDCCH configuration information, wherein the target search space corresponds to the current random access type.

10. A network device, comprising a processor, a memory, and a computer program stored in the memory and capable of running on the processor, wherein when the computer program is executed by the processor, the steps of an information transmission method are implemented, and the information transmission method comprises:

transmitting downlink control information (DCI) to a terminal device based on a current random access type, wherein the DCI is used to schedule a random access response message corresponding to the current random access type;

wherein the DCI is scrambled by a random access radio network temporary identity (RA-RNTI), and the RA-RNTI is associated with the current random access type, and wherein the RA-RNTI is calculated using the following formula:

RA-RNTI=
$1+n1 \times s\_id+n2 \times 14 \times t\_id+n3 \times 14 \times A \times f\_id+n4 \times 14 \times A \times B \times ul\_carrier\_id+n5 \times E\_id$, wherein s_id is an OFDM symbol index of the first symbol of a PRACH time domain resource, t_id is a slot index of the first slot of the PRACH time domain resource, and f_id is a frequency-domain index of an RO on the PRACH time domain resource;

A is any one of the following numerical values: a natural number configured by the network device, a preset value, a numerical value indicated by the terminal device, or the number of slots in a preset time window;

B is any one of the following numerical values: a natural number configured by the network device, a preset value, a numerical value indicated by the terminal device, or the number of ROs for FDM on the PRACH time domain resource;

ul_carrier_id is any one of the following numerical values: a natural number configured by the network device, a preset value, or a numerical value indicated by the terminal device;

n1, n2, n3, n4, and n5 are preset coefficients; and

E_id is a variable associated with random access type.

11. A terminal device, comprising a processor, a memory, and a computer program stored in the memory and capable of running on the processor, wherein when the computer program is executed by the processor, the steps of the information detection method according to claim 5 are implemented.

12. The terminal device according to claim 11, wherein the performing detection for target CI based on a current random access type comprises:

performing, based on the current random access type, detection for the target DCI scrambled by an RA-RNTI, wherein the RA-RNTI is associated with the current random access type.

13. The terminal device according to claim 12, Wherein the RA-RNTI is calculated using the following formula:

RA-RNTI=
$1+n1 \times s\_id+n2 \times 14 \times t\_id+n3 \times 14 \times A \times f\_id+n4 \times 14 \times A \times B \times ul\_carrier\_id+n5 \times E\_id$, wherein s_id is an OFDM symbol index of the first symbol of a PRACH time domain resource, t_id is a slot index of the first slot of the PRACH time domain resource, and f_id is a frequency-domain index of an RO on the PRACH time domain resource;

A is any one of the following numerical values: a natural number configured by the network device, a preset value, a numerical value indicated by the terminal device, or the number of slots in a preset time window;

B is any one of the following numerical values: a natural number configured by the network device, a preset value, a numerical value indicated by the terminal device, or the number of ROs for FDM on the PRACH time domain resource;

ul_carrier_id is any one of the following numerical values: a natural number configured by the network device, a preset value, or a numerical value indicated by the terminal device;

n1, n2, n3, n4, and n5 are preset coefficients; and

E_id is a variable associated with random access type.

14. A non-transitory computer-readable storage medium, wherein the non-transitory computer-readable storage medium stores a computer program, and when the computer program is executed by a processor, the steps of the information transmission method according to claim 1 are implemented.

\* \* \* \* \*